United States Patent
Ushiro et al.

(10) Patent No.: US 12,148,308 B2
(45) Date of Patent: Nov. 19, 2024

(54) INFORMATION PROCESSING APPARATUS AND INFORMATION PROCESSING METHOD

(71) Applicant: NTT DOCOMO, INC., Tokyo (JP)

(72) Inventors: Tomoe Ushiro, Tokyo (JP); Naoki Kameyama, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 304 days.

(21) Appl. No.: 17/617,699

(22) PCT Filed: Jun. 25, 2020

(86) PCT No.: PCT/JP2020/025009
§ 371 (c)(1),
(2) Date: Dec. 9, 2021

(87) PCT Pub. No.: WO2020/262528
PCT Pub. Date: Dec. 30, 2020

(65) Prior Publication Data
US 2022/0238026 A1     Jul. 28, 2022

(30) Foreign Application Priority Data
Jun. 27, 2019   (JP) .................................. 2019-120212

(51) Int. Cl.
*G08G 5/00*         (2006.01)
*G01S 19/08*        (2010.01)
(Continued)

(52) U.S. Cl.
CPC ............ *G08G 5/0013* (2013.01); *G01S 19/08* (2013.01); *G08G 5/0078* (2013.01);
(Continued)

(58) Field of Classification Search
CPC .. G08G 5/0013; G08G 5/0078; G08G 5/0026; G08G 5/0052; G08G 5/0069;
(Continued)

(56) References Cited

U.S. PATENT DOCUMENTS

2018/0032088 A1*   2/2018   van Cruyningen .... G06V 20/13

FOREIGN PATENT DOCUMENTS

JP        2003084057 A      3/2003

OTHER PUBLICATIONS

International Search Report issued in corresponding PCT Application No. PCT/JP2020/025009, dated Sep. 8, 2020.

* cited by examiner

*Primary Examiner* — Yuen Wong
(74) *Attorney, Agent, or Firm* — DILWORTH IP, LLC

(57) ABSTRACT

Server apparatus, by controlling flight vehicle, causes flight vehicle to fly to a close range of a power-transmission line, and causes flight vehicle to capture images of the power-transmission line. Flight vehicle includes a positioning apparatus of GPS, and the flight of flight vehicle is controlled based on this measured position. On the other hand, each base station in communication network is provided with a positioning apparatus of GPS. The measured position of base station measured by the positioning apparatus is used to specify the error in position of flight vehicle determined by the positioning apparatus. Server apparatus restricts the flight of flight vehicle if the error in position of flight vehicle, which is determined by the positioning apparatus, that captures images of the power-transmission line is a threshold value or more.

7 Claims, 3 Drawing Sheets

(51) Int. Cl.
*B64U 101/26* (2023.01)
*B64U 101/30* (2023.01)

(52) U.S. Cl.
CPC ...... *B64U 2101/26* (2023.01); *B64U 2101/30* (2023.01); *B64U 2201/10* (2023.01)

(58) Field of Classification Search
CPC ...... G08G 5/0091; G08G 5/045; G01S 19/08; G01S 19/14; G01S 19/396; B64C 39/024; B64C 13/18; B64C 13/20; B64U 2101/30; B64U 2201/00; G05D 1/10
See application file for complete search history.

INFORMATION PROCESSING APPARATUS AND INFORMATION PROCESSING METHOD

TECHNICAL FIELD

The present invention relates to a technique for controlling a flight vehicle based on the position of the flight vehicle.

BACKGROUND

It is known that an error occurs in the positioning called GPS (Global Positioning System). For example, Japanese Patent Application No. JP-2003-84057A discloses a technique in which the position of a mobile station that is determined by a GPS apparatus is corrected using a difference between the position of a reference station that is determined by the GPS apparatus and the accurate position of the reference station that has been determined in advance.

SUMMARY OF INVENTION

Incidentally, in recent years, unmanned flight vehicles called drones have become widespread. A mechanism is considered in which images of a facility such as a power-transmission line or a building are captured using this type of flight vehicle, and the inspection of the facility is automatically performed. However, an error occurs in the GPS positioning, as described above, and therefore, when image-capturing is performed by a flight vehicle while approaching to a close range of a power-transmission line, for example, it cannot be denied the possibility that an accident such as the flight vehicle coming into contact with the power-transmission line occurs, depending on the magnitude of the error.

Accordingly, an object of the present invention is to suppress an accident that may occur due to a positioning error of a flight vehicle.

In order to solve the problem described above, the present invention provides an information processing apparatus including: a determining unit that determines whether an error in position measured by a positioning apparatus included in a facility is a threshold value or more, the facility being located at a known position; and a control unit that controls flight of a flight vehicle based on a position measured by another positioning apparatus included in the flight vehicle, and restricts, when the determining unit determines that the error is the threshold value or more, the flight of the flight vehicle that flies within a range from the facility.

The determining unit may perform a determination when a position history of the flight vehicle measured by the other positioning apparatus of the flight vehicle satisfies a condition for determining that an error at a threshold value or more occurs in the position.

The control unit, after restricting the flight of the flight vehicle, when the determining unit determines that the error is less than the threshold value, may cancel a restriction of the flight.

The determining unit may use a different threshold value in accordance with a required position accuracy where the flight vehicle flies or a factor that is an obstacle to the flight of the flight vehicle.

A restriction of the flight by the control unit may be to prevent from changing a flight position of the flight vehicle or to prevent the flight vehicle from approaching an object.

The control unit may impose a restriction of the flight in a period during which inspection of an object is performed by the flight vehicle, and the control unit may not impose the restriction in a period other than the period during which the inspection of the object is performed by the flight vehicle.

The flight vehicle may capture an image of an object while flying, and the facility may be a base station that performs wireless communication with a communication apparatus of the flight vehicle.

Also, the present invention provides an information processing method including: a step of determining whether an error in position measured by a positioning apparatus included in a facility is a threshold value or more, the facility being located at a known position; and a step of controlling flight of a flight vehicle based on a position measured by another positioning apparatus included in the flight vehicle, and restricts, when the error is determined to be the threshold value or more, the flight of the flight vehicle that flies within a range from the facility.

According to the present invention, an accident that may occur due to a positioning error of a flight vehicle can be suppressed.

DETAILED DESCRIPTION

Configuration

Figure 1:
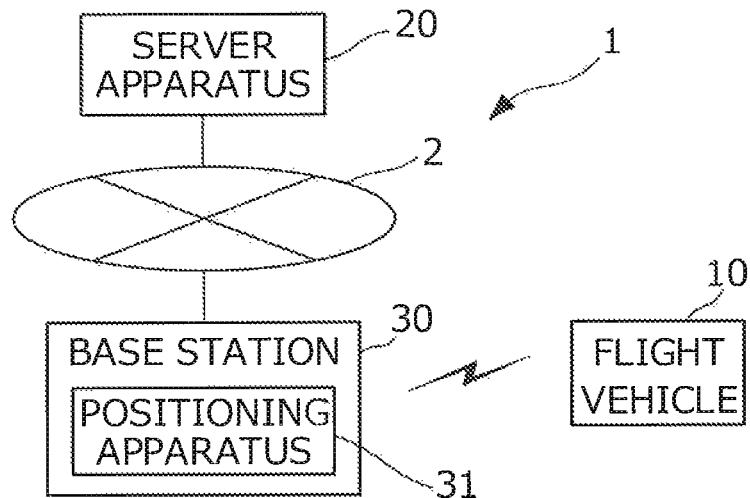
FIG. 1 is a diagram illustrating an example of a configuration of flight system in accordance with the present invention.

FIG. 1 is a diagram illustrating an example of a configuration of flight system 1. Flight system 1 is a system for remotely performing inspection of an object targeted for some processing or work such as a power-transmission line. Flight system 1 includes unmanned flight vehicle 10 called a drone, server apparatus 20, and communication network 2 for communicably connecting these apparatuses. Server apparatus 20 functions as an information processing apparatus for controlling flight vehicle 10. Communication network 2 is a wireless communication network such as LTE (Long Term Evolution), and includes a plurality of facilities called base stations 30. Flight vehicle 10 may be a flight vehicle that flies according to an operation made on a pilot terminal by an unshown pilot (so-called manual pilot flight), a flight vehicle that autonomously flies (so-called automatic pilot flight) under management by an unshown flight management apparatus, or a flight vehicle that utilizes both of the manual pilot flight and the automatic pilot flight. In the present embodiment, an example in which a flight vehicle that performs the automatic pilot flight is used will be described.

Server apparatus 20, by controlling flight vehicle 10, causes flight vehicle 10 to fly to a close range of a power-transmission line to be inspected, and causes flight vehicle 10 to capture images of the power-transmission line. Flight vehicle 10 transmits captured image data of the power-transmission line to server apparatus 20 via communication network 2, and server apparatus 20 examines whether or not a defect is present in the power-transmission line using the captured image data with a method such as image analysis. Flight vehicle 10 is provided with a positioning apparatus that measures its position by OPS, and the flight of flight vehicle 10 is controlled by server apparatus 20 based on the measured position. On the other hand, each base station 30 on communication network 2 is also provided with positioning apparatus 31 that measures its position by GPS. The position of base station 30 determined by positioning apparatus 31 is used for specifying an error in position of flight vehicle 10 determined by the positioning apparatus. This error differs according to the location and time. If it is determined that the error in position of flight vehicle 10 determined by the positioning apparatus is a threshold value or more, server apparatus 20 restrict the flight of flight vehicle 10.

Figure 2:
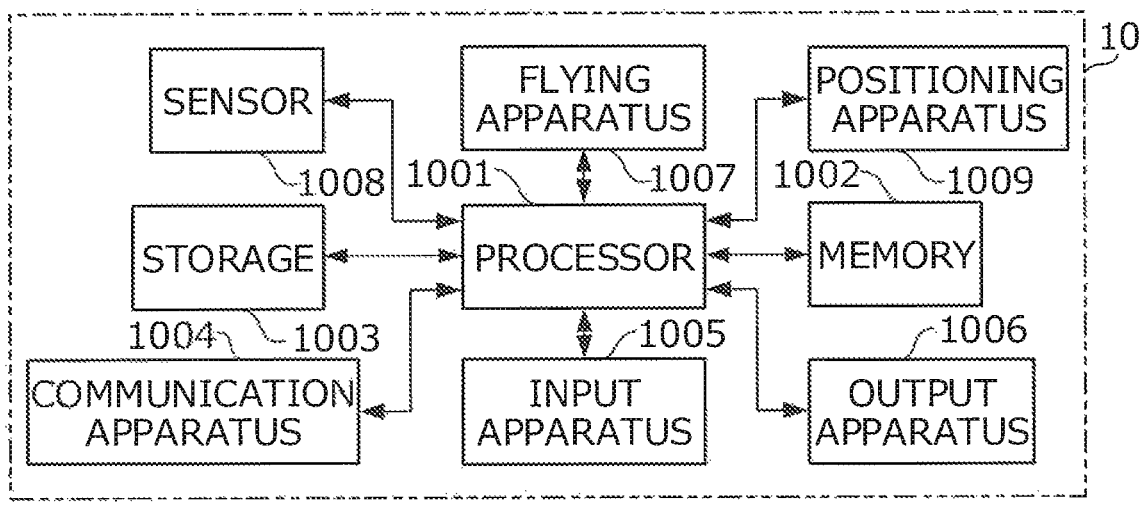
FIG. 2 is a diagram illustrating a hardware configuration of flight vehicle in accordance with the present invention.

FIG. 2 is a diagram illustrating a hardware configuration of flight vehicle 10. Physically, flight vehicle 10 is configured as a computer apparatus that includes processor 1001, memory 1002, storage 1003, communication apparatus 1004, input apparatus 1005, output apparatus 1006, flying apparatus 1007, sensor 1008, positioning apparatus 1009, a bus for connecting these apparatuses, and the like. These apparatuses operate using power supplied from a battery that is not illustrated. Note that, in the following description, the term "apparatus" can be replaced with "circuit", "device", "unit", or the like. The hardware configuration of flight vehicle 10 may also be configured to include, with respect to each apparatus shown in the diagram, one or a plurality of the apparatuses, or may also be configured to not include some apparatuses.

Functions of flight vehicle 10 are realized by causing predetermined software (programs) to be loaded on hardware such as processor 1001 and memory 1002 and processor 1001 performing computational operations to control communication by communication apparatus 1004, and to control at least one of reading and writing of data in memory 1002 and storage 1003.

Processor 1001 controls the computer as a whole by causing an operating system to run, for example. Processor 1001 may be constituted by a central processing unit (CPU) including an interface with peripheral apparatuses, a control apparatus, a computational operation apparatus, registers, and the like. Also, a baseband signal processing unit, a call processing unit, and the like may be realized by processor 1001, for example.

Processor 1001 reads a program (program code), a software module, data, and the like from at least one of storage 1003 and communication apparatus 1004 into memory 1002, and executes various processing according to the read-out program and the like. A program that causes a computer to execute at least some of the later-described operations is used as the program. The functional blocks of flight vehicle 10 may be realized by a control program that is stored in memory 1002 and runs in processor 1001. The various types of processing may be executed by one processor 1001, but may be executed simultaneously or sequentially by two or more processors 1001. Processor 1001 may be implemented using one or more chips. Note that a program may be transmitted from communication network 2 to flight vehicle 10 over an electrical communication line.

Memory 1002 is a computer-readable recording medium, and may be constituted by at least one of a ROM (Read Only Memory), an EPROM (Erasable Programmable ROM), an EEPROM (Electrically Erasable Programmable ROM), a RAM (Random Access Memory), and so on, for example. Memory 1002 may also be called a "register", "cache", "main memory" (a main storage apparatus), or the like. Memory 1002 can store an executable program (program code) for implementing a method according to the present embodiment, software modules, and the like.

Storage 1003 is a computer-readable recording medium, and for example, may be constituted by at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smartcard, a flash memory (for example, a card, a stick, or a key drive), a Floppy (registered trademark) disk, a magnetic strip, and the like. Storage 1003 may be called as an auxiliary storage apparatus. Storage 1003 stores identification information of flight vehicle 10 (referred to as flight vehicle identification information), for example. This flight vehicle identification information is used by server apparatus 20 to identify and control flight vehicle 10.

Communication apparatus 1004 is hardware (transmitting and receiving device) for performing communication between computers via communication network 2, and is also referred to as a network device, a network controller, a network card, and a communication module, for example. Communication apparatus 1004 may be constituted by a high frequency switch, a duplexer, a filter, a frequency synthesizer, and the like, in order to realize at least one of frequency division duplex (FDD) and time division duplex (TDD), for example. For example, a transmitting and receiving antenna, an amplifier unit, a transmitting and receiving unit, a transmission path interface, and the like may also be realized by communication apparatus 1004. The transmitting and receiving unit may be implemented by physically or logically separating the transmission control unit and the receiving unit. This communication apparatus 1004 performs wireless communication with base station 30.

Input apparatus 1005 is an input device (e.g., key, microphone, switch, button, and the like) that receives an input from an external apparatus, and in particular, includes an image capturing apparatus. Output apparatus 1006 is an output device (e.g., display, speaker, LED lamp, and the like) that performs output to an external apparatus.

Flying apparatus 1007 is a mechanism for flight vehicle 10 to fly in the air, and includes a propeller, a motor and a driving mechanism for driving the propeller, for example.

Sensor 1008 includes a sensor group of a temperature sensor, a rotation speed sensor for detecting the number of rotations of a motor, a sensor for detecting a value regarding some kind of input/output such as current/voltage (e.g., a battery power remaining capacity sensor), a gyrosensor, an acceleration sensor, an atmospheric pressure (altitude) sensor, a magnetic (direction) sensor, an ultrasonic sensor, and the like.

Positioning apparatus 1009 measures the three-dimensional position of flight vehicle 10). Positioning apparatus 1009 is a GPS receiver, and measures the position of flight vehicle 10 based on GPS signals received from a plurality of satellites.

Apparatuses such as processor 1001 and memory 1002 are connected via a bus for communicating information. The bus may be constituted by a single bus, or may be constituted by a plurality of buses for connections between apparatuses.

Flight vehicle 10 may be constituted by hardware such as a microprocessor, a digital signal processor (DSP), an ASIC (Application Specific Integrated Circuit), a PLD (Programmable Device), an FPGA (Field Programmable Gate Array), and the like, and some of or all of the functional blocks may be realized by the hardware. For example, processor 1001 may be implemented using at least one piece of hardware.

Figure 3:
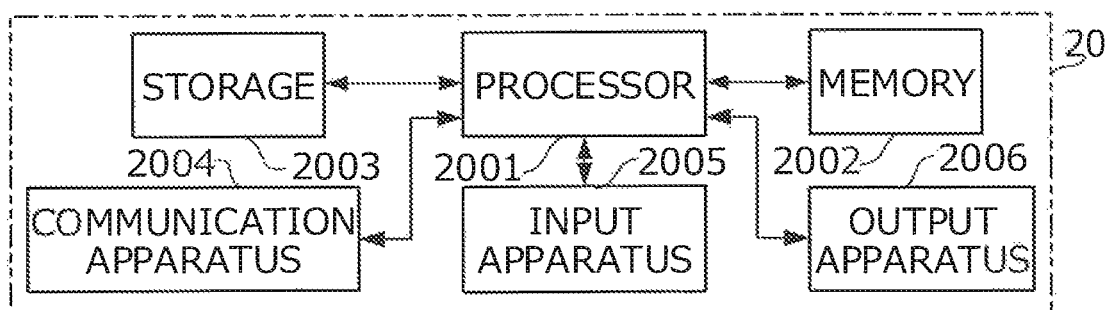
FIG. 3 is a diagram illustrating a hardware configuration of server apparatus in accordance with the present invention.

FIG. 3 is a diagram illustrating a hardware configuration of server apparatus 20. Physically, server apparatus 20 is configured as a computer apparatus that includes processor 2001, memory 2002, storage 2003, communication apparatus 2004 input apparatus 2005, output apparatus 2006, and a bus for connecting these apparatuses. Functions of server apparatus 20 are realized by causing predetermined software (programs) to be loaded on hardware such as processor 2001 and memory 2002, and processor 2001 performing computational operations to control communication by communication apparatus 2004, and to control at least one of reading and writing of data in memory 2002 and storage 2003. Processor 2001, memory 2002, storage 2003, communication apparatus 2004, and the bus for connecting these apparatuses are similar, as hardware, to processor 1001, memory 1002, storage 1003, communication apparatus 1004, and the bus for connecting these apparatuses that are described regarding flight vehicle 10, and therefore the description of these will be omitted.

Storage 2003 stores identification information and the known position of each base station 30 in an associated manner.

Input apparatus 2005 is an input device (e.g., keyboard, mouse, microphone, switch, button, sensor, joystick, ball controller, and the like) for receiving input from an external apparatus. Output apparatus 2006 is an output device (e.g., display, speaker, LED lamp, and the like) for performing output to an external apparatus. Note that input apparatus 2005 and output apparatus 2006 may be integrally configured (e.g., touch panel).

Figure 4:
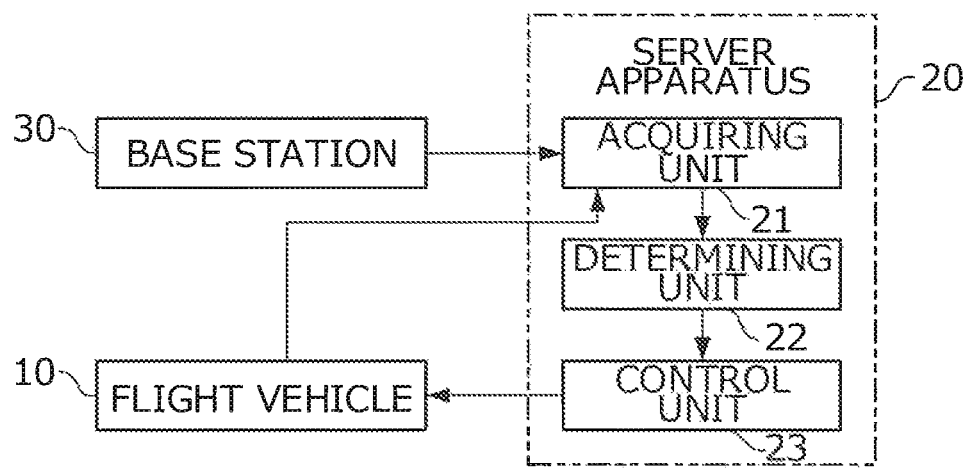
FIG. 4 is a diagram illustrating an example of a functional configuration of flight system in accordance with the present invention.

FIG. 4 is a diagram illustrating an example of a functional configuration of flight system 1. In server apparatus 20, acquiring unit 21 acquires various types of data (e.g., measured position and various types of behavior data such as attitude of flight vehicle 10 and captured image data obtained by flight vehicle 10) from flight vehicle 10 via communication network 2. Also, acquiring unit 21 acquires a measured position of base station 30 from base station 30 via communication network 2.

If a condition is satisfied under which it is determined that an error of a threshold value or more possibly occurs in the measured position from a history of the measured position of flight vehicle 10, determining unit 22 determines whether or not the error in measured position measured by base station 30 is a threshold value or more. The condition under which it is determined that an error of a threshold value or more possibly occurs in the measured position from a history of the measured position of flight vehicle 10 includes a case where the latest measured position separates from an approximate curve of measured positions up to now in the historical data by a given amount or more, for example. As described above, the position of base station 30 is already known, and the known position is stored in storage 2003. If it is determined that an error of the threshold value or more possibly occurs in the measured position of flight vehicle 10, determining unit 22 compares the known position of base station 30 (e.g., base station 30 that performs wireless communication with communication apparatus 1004 of flight vehicle 10) that is present in the neighborhood of flight vehicle 10 with the measured position of base station 30, determines the difference therebetween as the positioning error due to GPS, and compares the difference with the threshold value.

Control unit 23 controls the flight of flight vehicle 10 based on the measured position measured by flight vehicle 10 of interest. Here, if determining unit 22 determines that the error in measured position measured by base station 30 is the threshold value or more, control unit 23 determines that the error in measured position measured by flight vehicle 10 that flies in the neighborhood of base station 30 of interest is not negligible, and restricts flights of flight vehicles 10 that fly in a certain range from base station 30 of interest. If determining unit 22 determines that the error in the measured position is less than the threshold value, after restricting flights of flight vehicles 10, control unit 23 cancels the restriction. The restriction of flight by control unit 23 mentioned here is restriction such that the flight position of flight vehicle 10 will not be changed or flight vehicle 10 will not approach the object to be inspected, and is causing flight vehicle 10 to perform hovering to stand still in the air, for example.

Operations

Next, the operations of server apparatus 20 will be described. Note that, in the following description, when server apparatus 20 is described as an agent of processing, specifically, it means that the processing is executed by processor 2001 performing computation in response to predetermined software (program) being loaded onto hardware such as processor 2001 and memory 2002, and controlling communication by communication apparatus 2004 and reading-out and/or writing of data in memory 2002 and storage 2003. The same applies to flight vehicle 10.

Figure 5:
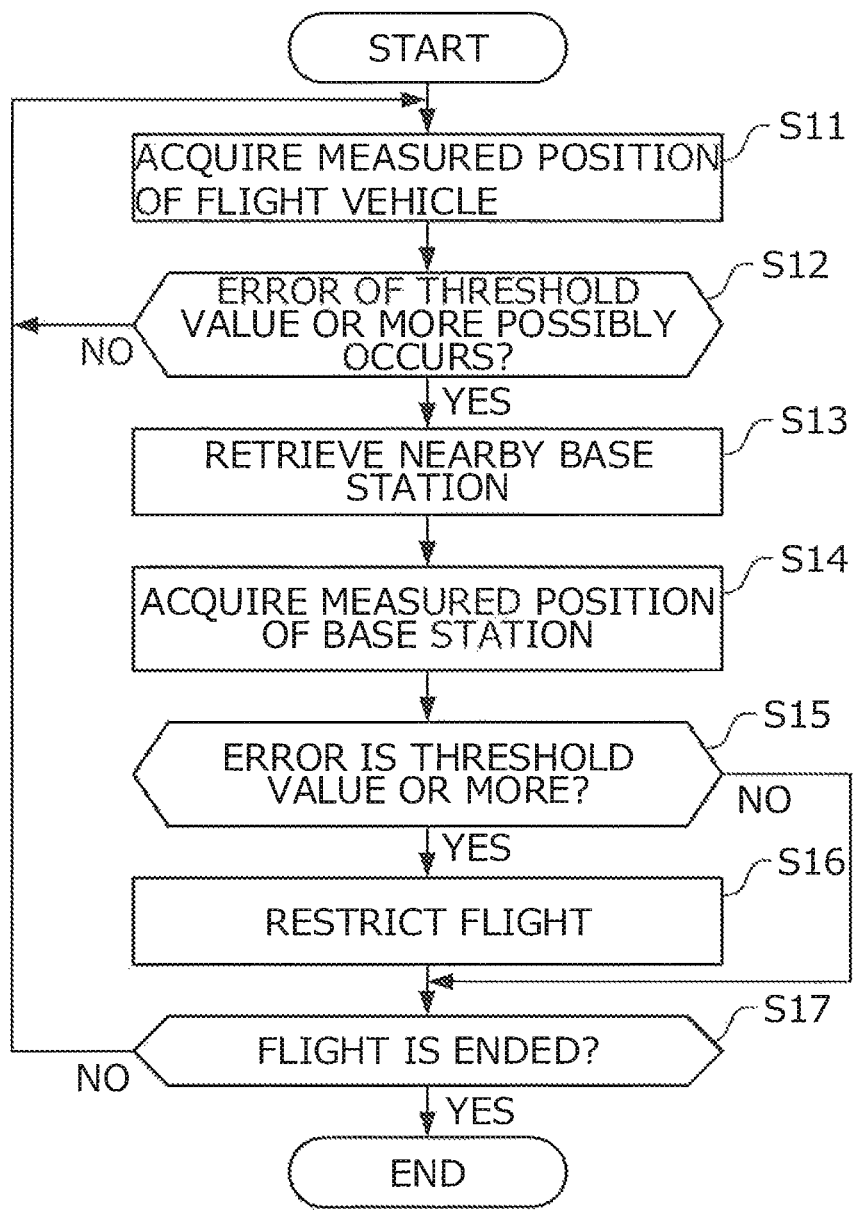
FIG. 5 is a flowchart illustrating an example of operations of server apparatus in accordance with the present invention.

In FIG. 5, acquiring unit 21 of server apparatus 20 regularly acquires data including a measured position measured by positioning apparatus 1009 from flight vehicle 10 that has started flight via communication network 2 (step S11). This measured position is stored in storage 2003 of server apparatus 20 as historical data until the flight of flight vehicle 10 ends.

Next, determining unit 22 determines whether or not an error of a threshold value or more possibly occurs in measured position measured by flight vehicle 10 (step S12). That is, when the latest measured position measured by flight vehicle 10 separates from an approximate curve of measured positions up to now in the historical data by a given amount or more, determining unit 22 determines that an error of the threshold value or more possibly occurs in the measured position measured by flight vehicle 10.

If it is determined that an error of the threshold value or more possibly occurs in the measured position measured by flight vehicle 10 (step S12; YES), determining unit 22 retrieves identification information of base station 30 that is present in the neighborhood of flight vehicle 10 for which it is determined that an error possibly occurs in the measured position, from the storage contents in storage 2003 (step S13). Base station 30 that is present in the neighborhood of flight vehicle 10 is base station 30 that performs wireless communication with communication apparatus 1004 of flight vehicle 10, for example, but may also be, in place of this, base station 30 that is arranged at a position (known position) closest to the measured position of flight vehicle 10.

Next, determining unit 22 acquires a measured position measured by positioning apparatus 31 from base station 30 that has been retrieved via communication network 2 (step SN). Also, determining unit 22 compares the position stored as the known position of base station 30 of interest with the measured position acquired in step S14, and determines whether or not the difference therebetween (that is, an error is the threshold value or more (step S15).

If determining unit 22 determines that the error in measured position measured by base station 30 is the threshold value or more (step S15; YES), control unit 23 restricts the flight of aforementioned flight vehicle 10 (step S16). With this restriction, flight vehicle 10 stands still in the air until the error in measured position becomes less than the threshold value, for example, and therefore the possibility that flight vehicle 10 approaches and comes into contact with a power-transmission line or the like is reduced. Such processing is repeated until the flight of flight vehicle 10 ends.

According to the embodiment described above, a failure that may occur due to a positioning error of flight vehicle can be reduced.

Modifications

The present invention is not limited to the embodiment described above. The embodiment described above may be modified as follows. Also, two or more of the following modifications may be implemented in a combined manner.

Modification 1

Determining unit 22 may use, instead of a fixed threshold value, a variable threshold value as the threshold value when determining whether or not an error is the threshold value or more. Specifically, determining unit 22 may use a different threshold value according to the required accuracy in position when flight vehicle 10 makes a flight or the factor that is an obstacle to the flight of flight vehicle 10. The required accuracy in position when flight vehicle 10 makes a flight is the accuracy obtained based on the distance between flight vehicle 10 and the object to be inspected, the complexity of a flight route, or the like. That is, when a short distance is required as the distance between flight vehicle 10 and the object to be inspected, it is possible that flight vehicle 10 comes into contact with the object to be inspected if a minute error is present in the measured position, and therefore the required accuracy in position when flight vehicle 10 makes a flight can be said to high. In this case, a relatively small threshold value is used. The same applies to a case where the structure of an object to be inspected is complex, and flight vehicle 10 flies a gap of the structure, for example. On the other hand, if the distance between flight vehicle 10 and the object to be inspected is allowed to be relatively large, the possibility that flight vehicle 10 comes into contact with the object to be inspected is small even if some error is present in the measured position, and therefore the required accuracy in position when flight vehicle 10 makes a flight can be said to low. In this case, a relatively large threshold value is used. Also, the same applies to a case where the structure of an object to be inspected is simple, and flight vehicle 10 flies around the object to be inspected to perform capturing, for example.

Also, the factor that is an obstacle to the flight of flight vehicle 10 is wind, rain, snowfall, and the like. When such a factor is present, the flight control of flight vehicle 10 becomes difficult, and therefore it is possible that flight vehicle 10 comes into contact with the object to be inspected if a minute error is present in the measured position. Therefore, in this case, a relatively small threshold value is used. On the other hand, if such a factor is not present, the flight control of flight vehicle 10 becomes easy, and the possibility that flight vehicle 10 comes into contact with the object to be inspected is small even if some error is present in the measured position. Therefore, in this case, a relatively large threshold value is used.

Modification 2

The configuration may be such that control unit 23 imposes the restriction described above in a period in which inspection of an object is performed by flight vehicle 10, and does not impose the restriction described above in a period other than the period in which inspection of an object is performed by flight vehicle 10. It is because when flight vehicle 10 performs image-capturing of an object, there is a risk of flight vehicle 10 coming into contact with the object due to an error in measured position, but in contrast, in a period other than the period in which inspection of an object is performed such as a period in which flight vehicle 10 flies toward the object, there is no risk of flight vehicle 10 coming into contact with the object due to an error in measured position.

Modification 3

Positioning apparatus for specifying an error in measured position is not limited to an apparatus mounted on base station 30. That is, determining unit 22 need only specify the error based on a measured position measured by a positioning apparatus included in a facility whose position is known. Also, the positioning method is not limited to the method of using GPS that is illustrated in the embodiment, and the present invention can be applied to a positioning method with which an error that is not negligible in the flight of flight vehicle 10 may occur. Also, in the present invention, the object of flight of flight vehicle 10 is not limited to image-capturing of an object. Also, the embodiment described above shows an example in which automatic pilot flight is applied. When the present invention is applied to an example in which manual pilot flight is applied, when the error in measured position becomes a threshold value or more, the flight of flight vehicle 10 is forcibly restricted by the control performed by server apparatus 20 regardless of the manual operation made by a pilot. Note that in the embodiment described above, an example in which flight vehicle 10 flies alone was described, but the present invention may be applied to a case where a plurality of flight vehicles 10 fly at the same time and capture images of the same object over the same period.

Other Modifications

Note that the block diagram used in the description of the above embodiment shows blocks of functional units. These function blocks (constituent units) are realized by any combination of at least one of hardware and software. The method of realizing each function block is not particularly limited. That is, each functional block may be realized by using one apparatus physically or logically coupled, or may be realized by directly or indirectly connecting two or more apparatus that are physically or logically separated (using, for example, a wired connection, a wireless connection, or the like), and using the plurality of these apparatus. Function blocks may also be realized by combining the one apparatus or the plurality of apparatus with software.

Examples of functions include determining, deciding, summing, calculating, processing, deriving, surveying, searching, confirming, receiving, transmitting, outputting, accessing, solving, selecting, setting, establishing, comparing, assuming, expecting, considering, broadcasting, notifying, communicating, forwarding, configuring, reconfiguring, allocating, mapping, assigning, and the like, but these are not limitations. For example, a functional block (constituent unit) that causes transmission to function is called a transmission control unit (transmitting unit) or a transmitter (transmitter). In any case, as described above, the method of realizing a function is not particularly limited.

For example, the server apparatus or the like in one embodiment of present disclosure may function as a computer that performs processing of present disclosure.

The modes/embodiment described in the present disclosure may be applied to at least one of a system that uses LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-Wide Band), Bluetooth (registered trademark), or another appropriate system, and a next-generation system that has been expanded based on the systems described above. Also, a plurality of systems may also be applied in a combined mode (e.g., combination between at least one of LTE and LTE-A and 5G).

The order of the processing procedures, sequences, flowcharts and the like of the modes/embodiment described in the present disclosure may be changed, as long as there are no inconsistencies. For example, with regard to the methods described in the present disclosure, the elements of various steps are presented using an illustrative order, and are not limited to the specific order in which they are presented.

Information and the like that has been input/output may be saved in a specific location (for example, a memory), or may be managed using a management table. The information and the like that is input/output can be overwritten, updated, or added to. Information and the like that has been output may be deleted. Information and the like that has been input may be transmitted to another apparatus.

Determination may be performed according to a value (0 or 1) represented by 1 bit, or may be performed according to a Boolean value (Boolean: true or false), or may be performed by comparing numerical values (for example, comparison with a predetermined value).

Although the present disclosure has been described in detail above, it will be evident to a person skilled in the art that the disclosure is not limited to the embodiment described in the disclosure. The present disclosure can be implemented as in revised and modified modes without departing from the spirit and scope of the disclosure which is defined by the description in the claims. Accordingly, the description of the present disclosure is intended as an illustrative description and does not have any restrictive meaning with respect to the disclosure.

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and the like. Additionally, software, commands, and the like may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, at least one of these hardwired technologies and wireless technologies is included in the definition of "transmission medium".

The information, signals, and the like described in the present disclosure may be expressed using any of a variety of different techniques. For example, data, instructions, commands, information, signals, bits, symbols, chips, and the like that may be referred to throughout all of the foregoing descriptions may be expressed by voltages, currents, electromagnetic waves, magnetic fields or magnetic particles, photo fields or photons, or any desired combination thereof.

Note that a term that has been described in the present disclosure and a term needed to understand the present disclosure may be replaced by a term that has the same or similar meaning.

Also, information, a parameter, or the like that has been described in the present disclosure may be represented by an absolute value, by a relative value from a predetermined value, or by other corresponding information.

The phrase "based on" used in the present disclosure does not mean "based only on" unless specifically mentioned. In other words, the phrase "based on" means both "based only on" and "based at least on".

Any reference to an element for which a phrase such as "first" or "second" that is used in the present disclosure is used does not generally limit the amount or order of such an element. These phrases may be used in the present disclosure as a convenient method for distinguishing between two or more elements. Therefore, the reference to first and second elements does not mean that only the two elements are adopted, or the first element must precede the second element in any form.

The "unit" in the configuration of each apparatus described above may be replaced by a "means", a "circuit", a "device", or the like.

In the present disclosure, when terms "include" and "including" and a variety of these are used, these terms are intended to be comprehensive similarly to the term "comprising". Moreover, the term "or" used in the present disclosure is intended to be not exclusive OR.

When an article such as a, an, or the in English is added by translation in the present disclosure, for example, the present disclosure may include a case where a noun following these articles is a plural.

In the present disclosure, the phrase "A and B are different" may mean "A and B are different from each other". This phrase may mean that "A and B are each different from C". Terms such as "away" and "coupled" may be construed in a similar manner as "different".

REFERENCE SIGNS LIST

1 Flight system
2 Communication network
10 Flight vehicle
1001 Processor
1002 Memory
1003 Storage
1004 Communication apparatus
1005 Input apparatus
1006 Output apparatus
1007 Flying apparatus
1008 Sensor
1009 Positioning apparatus
20 Server apparatus
21 Acquiring unit
22 Determining unit
23 Control unit
2001 Processor
2002 Memory
2003 Storage
2004 Communication apparatus
2005 Input apparatus
2006 Output apparatus
30 Base station 31 Positioning apparatus

What is claimed is:

1. An information processing apparatus comprising:
a processor configured to:
determine whether an error in position measured by a positioning apparatus included in a facility is a threshold value or more, the facility being located at a known position; and
control flight of a flight vehicle based on a position measured by another positioning apparatus included in the flight vehicle, and restrict, when the error is the threshold value or more, the flight of the flight vehicle that flies within a range from the facility by controlling the flight vehicle to perform hovering to stand still at flight position or by controlling the flight vehicle to not approach the facility, until the error becomes less than the threshold value.

2. The information processing apparatus according to claim 1, wherein the processor is further configured to perform a determination when a position history of the flight vehicle measured by the another positioning apparatus of the flight vehicle satisfies a condition for determining that the error is at the threshold value or more occurs in the position.

3. The information processing apparatus according to claim 1, wherein the processor is further configured to, after restricting the flight of the flight vehicle, when the error is less than the threshold value, cancel the restriction of the flight.

4. The information processing apparatus according to claim 1, wherein the processor is further configured to use a different threshold value in accordance with at least one of a required position accuracy where the flight vehicle flies and a factor that is an obstacle to the flight of the flight vehicle.

5. The information processing apparatus according to claim 1, wherein the processor is further configured to impose the restriction of the flight in a period during which inspection of an object is performed by the flight vehicle, and the processor is further configured to not impose the restriction in the period other than the period during which the inspection of the object is performed by the flight vehicle.

6. The information processing apparatus according to claim 1, wherein the flight vehicle captures an image of an object while flying, and the facility is a base station that performs wireless communication with a communication apparatus of the flight vehicle.

7. An information processing method comprising:
determining whether an error in position measured by a positioning apparatus included in a facility is a threshold value or more, the facility being located at a known position; and
controlling flight of a flight vehicle based on a position measured by another positioning apparatus included in the flight vehicle, and restrict, when the error is determined to be the threshold value or more, the flight of the flight vehicle that flies within a range from the facility by controlling the flight vehicle to perform hovering to stand still at flight position or by controlling the flight vehicle to not approach the facility, until the error becomes less than the threshold value.

* * * * *